United States Patent [19]

Delloye et al.

[11] Patent Number: 5,266,282
[45] Date of Patent: Nov. 30, 1993

[54] SELECTIVE LIQUID/LIQUID EXTRACTION OF YTTRIUM FROM OTHER RARE EARTHS VALUES

[75] Inventors: Thierry Delloye, Perigny; Jean-Louis Sabot, Maisons Laffitte, both of France

[73] Assignee: Rhone-Poulenc Chimie, Courbevoie, France

[21] Appl. No.: 680,520

[22] Filed: Apr. 4, 1991

[30] Foreign Application Priority Data

Apr. 4, 1990 [FR] France .............................. 90 04300

[51] Int. Cl.$^5$ .............................................. C01F 17/00
[52] U.S. Cl. ........................................ 423/21.5; 423/157
[58] Field of Search ............................... 423/21.5, 157

[56] References Cited

U.S. PATENT DOCUMENTS

| | | | |
|---|---|---|---|
| 3,821,352 | 6/1974 | Gaudernack et al. | 423.21.5/ |
| 3,985,856 | 10/1976 | Johnson et al. | 423/43 |
| 4,058,585 | 11/1977 | MacKay et al. | 423/100 |
| 4,128,493 | 12/1978 | MacKay et al. | 252/184 |
| 4,255,394 | 3/1981 | Helgorsky et al. | 423/21.5 |

FOREIGN PATENT DOCUMENTS

| | | |
|---|---|---|
| 0143749 | 11/1984 | European Pat. Off. . |
| 0199905 | 2/1986 | European Pat. Off. . |
| 0238402 | 3/1987 | European Pat. Off. . |
| 0341119 | 4/1989 | European Pat. Off. . |
| 0347284 | 6/1989 | European Pat. Off. . |

OTHER PUBLICATIONS

French Search Report.

*Primary Examiner*—Theodore Morris
*Assistant Examiner*—P. L. Hailey
*Attorney, Agent, or Firm*—Burns, Doane, Swecker & Mathis

[57] ABSTRACT

Yttrium is selectively separated from other rare earth values by contacting a mixed aqueous solution thereof that contains nitrate ions with a water-immiscible organic phase which includes a selective extractant for such other rare earth values, whereby such other rare earth values are selectively liquid/liquid extracted into this organic phase, the selective extractant comprising:

(a) an anionic compound having the general formula (I):

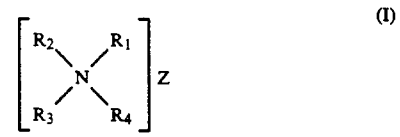

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

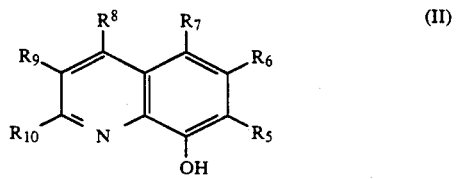

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms.

29 Claims, 1 Drawing Sheet

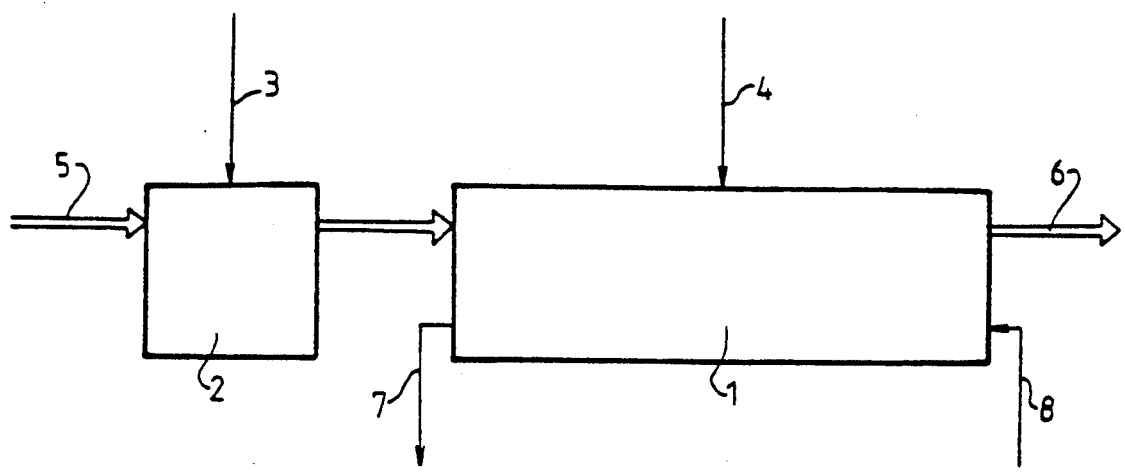

SELECTIVE LIQUID/LIQUID EXTRACTION OF YTTRIUM FROM OTHER RARE EARTHS VALUES

BACKGROUND OF THE INVENTION

1. Field of the Invention:

The present invention relates to the separation of yttrium values from aqueous solutions thereof, and, more especially, to the separation of yttrium values from aqueous solutions thereof including, in addition to said yttrium values, other rare earths.

By the term "rare earths" are intended the elements of the lanthanide group of the Periodic Table having an atomic number ranging from 57 to 71, inclusive, as well as yttrium which has the atomic number 39.

Also, by the term "ceric rare earths" are intended the lightest rare earth elements, beginning with lanthanum and extending to neodymium, and by the term "yttric rare earths" are intended the heaviest rare earth elements, beginning with samarium and concluding with lutetium and also including yttrium.

2. Description of the Prior Art:

It is known to this art that the separation of the rare earths contained in solutions resulting from the digestion of various ores, such as, for example, gadolinite, cerite, monazite, xenotime, bastnasite, and the like, is difficult to carry out, due to the fact that the differences in the properties of a rare earth with respect to those of neighboring elements in the Periodic Table are extremely small.

This separation is even more difficult because the rare earth must be recovered in isolated form with respect to the elements of the same subgroup, such as, for example, the separation of cerium from the other rare earths belonging to the group of "ceric rare earths".

These separations are typically carried out employing extraction processes using an extractant contained in a phase which is not miscible with the generally aqueous solution containing the rare earths.

The processes which are usually employed are liquid/liquid extraction techniques in which the extractant is dissolved in a water-immiscible organic diluent, and techniques entailing the use of resins on which the extractant is adsorbed.

Selective separation of an element with respect to other elements is achieved by judicious selection of the extractant and the extraction conditions. However, it is difficult to predict whether an extractant which is suitable for extracting a given element will be equally suitable for extracting another element. Moreover, the extraction conditions for a particular element also cannot be deduced from the conditions used for the extraction of another element.

Of the rare earths, yttrium is an element which is especially useful for luminophore compositions, as well as for applications in cathodic television tubes and in incandescent lamps.

Thus, a serious need continues to exist in this art for a simple improved process to directly separate yttrium, in a single step, from the other rare earths contained in a solution thereof, especially when yttrium is the predominant such element.

One process for the selective separation of yttrium values is described in U.S. Pat. No. 3,575,687. This process entails using, as the extractant, a mixture of an anionic extractant of the quaternary ammonium compound or phosphonium compound type with a cationic extractant selected from among aliphatic and aromatic phosphates and carboxylic acids.

However, this mixture of extractants presents several disadvantages, such as, for example, mediocre selectivity between yttrium and the heavy rare earths of the "yttric rare earth" group.

Such extractant mixture also presents other disadvantages, in particular a difficult back-extraction of the rare earths contained in the organic phase.

SUMMARY OF THE INVENTION

Accordingly, a major object of the present invention is the provision of a simple improved process for the selective separation of yttrium values from other rare earths values by liquid/liquid extraction of aqueous solutions of such values employing an extractant in a phase which is water-immiscible and has good selectivity for yttrium with respect to the other rare earths, and especially those elements belonging to the group of "yttrium rare earths".

Briefly, the present invention features a process for the selective separation of yttrium from aqueous solutions containing at least nitrate ions and other rare earths, comprising contacting such solution with a phase which is not miscible with said aqueous solution and which contains an extractant that comprises admixture of:

(a) an anionic extractant selected from among the ammonium, phosphonium or arsenium compounds of the general formula (I):

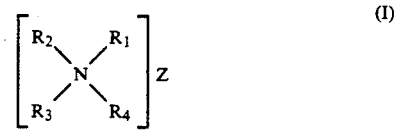

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline of the general formula (II):

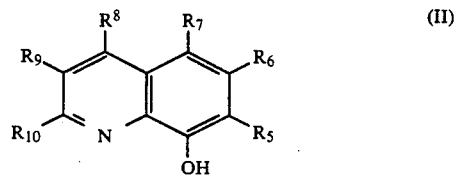

in which the substituents $R_5$, $R_6$, $R_7$, $R_8$, $R_9$ and $R_{10}$, which may be identical or different, are each a hydrogen or halogen atom, or a substituted or unsubstituted hydrocarbon radical selected from among alkyl, alkenyl, cycloaliphatic and aromatic radicals, with the proviso that at least one of such substituents is a hydrocarbon radical having from 8 to 20 carbon atoms.

BRIEF DESCRIPTION OF THE DRAWINGS

The FIGURE of Drawing is a schematic/diagrammatic illustration of one embodiment of the process/apparatus according to the present invention.

DETAILED DESCRIPTION OF THE PREFERRED EMBODIMENTS OF THE INVENTION

More particularly according to the present invention, in a preferred embodiment thereof, the substituted hydroxyquinoline has the general formula III:

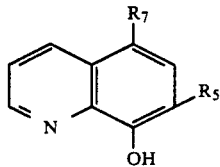

(III)

in which $R_5$ is a substituted or unsubstituted alkenyl radical having from 8 to 20 carbon atoms, and $R_7$ is a hydrogen or halogen atom or a substituted or unsubstituted alkyl, alkenyl, cycloaliphatic or aromatic radical.

Among such hydroxyquinolines, those which are particularly preferred according to the invention are:

(i) α-alkenyl-8-hydroxyquinolines having the general formula IV:

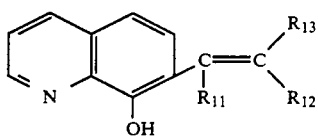

(IV)

in which $R_{11}$, $R_{12}$ and $R_{13}$ are each hydrogen or a substituted or unsubstituted hydrocarbon radical; and (ii) β-alkenyl-8-hydroxyquinolines having the general formula V:

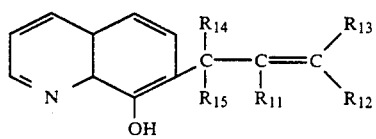

(V)

in which $R_{11}$, $R_{12}$, $R_{13}$, $R_{14}$ and $R_{15}$ are each hydrogen or a substituted or unsubstituted hydrocarbon radical.

Compounds which are likewise preferred according to this invention are the alkyl-8-hydroxyquinolines having the general formula VI:

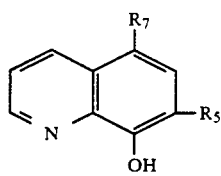

(VI)

in which $R_5$ is a substituted or unsubstituted alkyl or cycloaliphatic radical preferably having from 8 to 20 carbon atoms, and $R_7$ is a hydrogen or halogen atom or a substituted or unsubstituted alkyl, alkenyl, cycloaliphatic or aromatic radical.

Compounds which are also suitable for carrying out the process of the invention are the 8-hydroxyquinolines of the general formula VII:

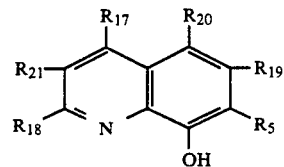

(VII)

in which $R_5$ is a substituted or unsubstituted alkyl or cycloaliphatic hydrocarbon radical and $R_{17}$, $R_{18}$, $R_{19}$, $R_{20}$ and $R_{21}$, which may be identical or different, are each hydrogen or a substituted or unsubstituted hydrocarbon radical.

Also suitable are the 8-hydroxyquinolines of the general formula VIII:

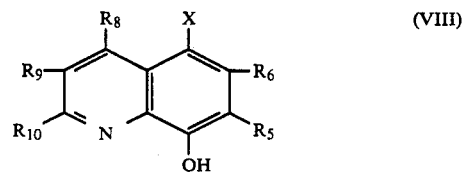

(VIII)

in which X is a halogen, $R_5$ is an alkyl or alkenyl radical preferably having from 8 to 20 carbon atoms and $R_8$, $R_9$, and $R_{10}$, which may be identical or different, are as defined in formula II.

Exemplary substituted hydroxyquinolines which are suitable and commercially available are the products marketed by SCHERING under the trademarks "Kelex 100" (formula V or VI) and "Kelex 108" (formula VI), and by HENKEL under the trademark "LIX 26".

The anionic extractants of general formula I suitable for carrying out the process of the invention include, in particular, those marketed under the trademarks "ALIQUAT 336" by HENKEL, "ADOGEN 464" by SCHERING and "HOE S 2706" by HOECHST.

The water-immiscible phase containing the extractants also comprises an organic diluent, which characteristically is "inert", namely, does not adversely affect the strength of extraction of the extractants.

Exemplary such diluents include the aromatic hydrocarbons, such as xylene, toluene, benzene, diethylbenzene, or petroleum fractions of the Solvesso type (trademark of EXXON); aliphatic hydrocarbons, such as hexane, cyclohexane, and petroleum fractions of the kerosene type; halogenated hydrocarbons, such as chloroform, carbon tetrachloride; petroleum ethers, and the like. These diluents can be used either alone or as mixtures thereof.

The organic phase can also contain various modifying agents, the purpose of which is, in particular, to improve the hydrodynamic properties of the system without altering the complexing properties of the extractants. Exemplary such modifying agents include the aliphatic alcohols, alkylphenols, alkyl or arylphosphates, phosphonates or phosphinates, alkyl- or arylphosphine oxides or alkyl or aryl sulfoxides, ethers, and aliphatic or aromatic ketones.

The extracting power, or capacity for extraction, of the organic phase with respect to the rare earths increases with increasing concentrations of the extractants.

Nonetheless, the separation coefficient of yttrium from the other rare earths is virtually unaffected by the concentration of the extractants. Thus, the concentration of the substituted hydroxyquinoline and the anionic extractant can vary over wide limits.

In actual practice, the concentration of the extractants in the organic phase is determined by the hydrodynamic properties (especially viscosity) of the system.

Moreover, the hydroxyquinoline/anionic extractant ratio can likewise vary over wide limits without imparting too much of an effect on the separation coefficient between the yttrium and the rare earths.

In a preferred embodiment of the invention, the hydroxyquinoline concentration in the organic phase advantageously ranges from about 0.05 mol/liter to 1.25 mol/liter.

The anionic extractant concentration, in turn, advantageously ranges from about 0.1 mol/l to 0.7 mol/l.

According to another characteristic feature of the invention, the yttrium-containing aqueous solution also contains nitrate ions originating either from the ionization of yttrium and/or rare earth salts, or from the addition of a compound containing nitrate ions, such as nitric acid, ammonium nitrates, or alkali metal nitrates and alkaline earth metal nitrates.

The nitrate ion concentration is advantageously greater than one mol/liter, and preferably ranges from 1 mol/l to 10 mol/l.

Advantageously, the pH of the solution to be treated ranges from 1 to 7. However, this pH can also vary over wide limits.

The extraction is carried out at an inert temperature. Advantageously, this temperature ranges from ambient temperature (15° C.–25° C.) to 60° C.

The aqueous yttrium solution is obtained by dissolving soluble rare earth compounds originating from the digestion of ores or of scraps containing yttrium and rare earths. The type and nature of these compounds and rare earth sources are not critical.

The concentrations of the rare earths and/or yttrium in the solution are also not critical.

In order to characterize the yttrium/rare earth separation efficiency, the partition coefficients $P_y$, $P_{RE}$ and the separation coefficient $F_{RE/Y}$, which are defined below, are determined.

By "yttrium partition coefficient $P_y$" is intended the ratio $$\frac{[Y]_{org}}{[Y]_{aq}}$$

in which $[Y]_{org}$ is the yttrium concentration in the organic phase and $[Y]_{aq}$ is the yttrium concentration in the aqueous phase.

By the "separation coefficient $F_{RE/Y}$" is intended the ratio $P_{RE}/P_y$, in which $P_{RE}$ is the rare earth partition coefficient, in accordance with the definition for $P_Y$.

The process of the invention is carried out employing conventional procedures of liquid/liquid extraction processes, for example in one or more batteries of mixer-settlers.

The recovered aqueous solution contains yttrium, while the rare earths are extracted by the organic phase.

The rare earths can then be back-extracted by washing the organic phase with water or an acidic solution, and the rare earth solution thus recovered can be treated, for example, by any process known for the separation thereof.

The yttrium-containing aqueous solution is treated in order to recover a yttrium compound. This treatment depends on the desired purity of the recovered yttrium. Thus, this solution can be subjected to several purification steps, concentration steps or the like.

The yttrium is recovered either by precipitation or by liquid/liquid extraction or ion exchange, or by electrolysis or any other suitable process.

The process for the recovery of yttrium according to the invention is preferably carried out using a liquid/liquid countercurrent extraction process. However, the invention is not limited to this method. Therefore, the invention can be carried out using an adsorption technique on a porous resin which serves as a support for the extractants. These extractants are then applied to the resin either in pure form or in solution in a diluent, for example, of the type described above.

Accordingly, the present invention features a process for the recovery of yttrium, which permits the separation thereof from the other rare earths in a single step and also the easy recovery of rare earths on the one hand, and yttrium on the other.

In order to further illustrate the present invention and the advantages thereof, the following specific examples are given, it being understood that same are intended only as illustrative and in nowise limitative.

EXAMPLE 1

An organic phase, designated the solvent, was contacted, volume by volume, with an aqueous rare earth nitrate solution.

The composition by volume of the solvent was:

| (i) | anionic extractant: | "Aliquat 336" | 30% |
| (ii) | hydroxyquinoline: | "Kelex 100" | 15% |
| (iii) | diluent: | "Solvesso 150" | 55% |

The diluent is commercially available from EXXON.

"Aliquat 336" is a mixture containing quatenary ammonium salts commercially available from HENKEL.

"Kelex 100" is a substituted hydroxyquinoline having the general formula VI and commercially available from SCHERING.

The composition of the aqueous solution was:

rare earth and yttrium nitrates at a concentration of 1.66 mol/l and a weight ratio of $Y_2O_3/RE_2O_3$ equal to 99.75%, or an $Ln_2O_3/Y_2O_3$ ratio equal to 2,500 ppm ($Ln_2O_3$ corresponding to the lanthanides).

The partition coefficients $P_Y$ and separation coefficients $F_{RE/Y}$ were determined for an extraction pH equal to 4.1.

The results are reported in Table I below:

TABLE I

| | Ce | Pr | Nd | Sm | Eu | Gd | Tb | Dy | Ho | Er | Tm | Yb | Lu |
|---|---|---|---|---|---|---|---|---|---|---|---|---|---|
| $F_{RE/Y}$ at a pH of 4.1 $P_y = 0.107$ | 180 | 64 | 23 | 15 | 8.5 | 4.9 | 4.5 | 3.6 | 2.8 | 2.3 | 2 | 2.9 | 1.4 |

EXAMPLE 2

The process conditions were identical to those of Example 1. The extraction pH was 4.5.

The aqueous solution likewise contained rare earth and yttrium nitrates at a concentration of 1.66 mol/l and a $Y_2O_3$ ratio with respect to the total rare earth oxides equal to 2% by weight.

The separation coefficients of Example 2, reported in Table II and compared with those of Example 1 above, demonstrate the influence of the $Y_2O_3/RE_2O_3$ ratio.

TABLE II

|  | Ce | Nd | Eu | Gd | Tb | Tm | Lu |
|---|---|---|---|---|---|---|---|
| $F_{RE/Y}$ at a pH of 4.5 Py = 0.01 6 | 16.5 | 10.7 | 8.6 | 5.0 | 9.6 | 9.0 | 10.3 |

EXAMPLE 3

The procedure of Example 1 was repeated, except that a solvent having the following composition by volume was employed:

| "Aliquat 336" | 30% |
|---|---|
| "Kelex 100" | 10% |
| "Solvesso" | 60% | and, as the aqueous solution, a rare earth chloride solution at a concentration of 0.166 mol/l to which ammonium nitrate had been added in order to provide an $NO_3^-$ concentration of 4 mol/l.

The $Y_2O_3$ content with respect to the total amount of oxides was 99.75%.

The extraction was carried out at a pH of 5.7.

The partition coefficient Py was equal to 0.162.

The separation coefficients $F_{RE/Y}$ are reported in Table III below:

TABLE III

| Rare Earth | La | Ce | Pr | Nd | Sm | Eu | Gd | Tb | Dy | Ho | Er | Tm | Yb | Lu |
|---|---|---|---|---|---|---|---|---|---|---|---|---|---|---|
| $F_{RE/Y}$ | 61 | 43 | 28 | 15.3 | 8.5 | 7.2 | 3.9 | 4.4 | 3.9 | 3.5 | 2.7 | 2.6 | 3.3 | 2.6 |

EXAMPLES 4 TO 7

Table IV below reports the results obtained for experiments carried out using different solvents under the process conditions of Example 1.

TABLE IV

| SOLVENT % by volume | pH | Py | F Yb/y | F Er/y | F Dy/y | F Sm/y |
|---|---|---|---|---|---|---|
| Aliquat "336" 30% Solvesso 65% Kelex 100 5% Example 4 | 4.94 | 0.0237 | 2.25 | 2.77 | 5.37 | 11.63 |
| Aliquat "336" 30% Solvesso 65% Kelex 108 5% Example 5 | 5.11 | 0.0276 | 3.12 | 2.62 | 5 | 10.04 |
| Aliquat "336" 30% Solvesso 65% 5% Example 6 | 5.18 | 0.0319 | 4.18 | 2.64 | 4.49 | 11.06 |
| Aliquat "336" 30% Solvesso 65% LIX 26 5% Example 7 | 5.23 | 0.0299 | 3.77 | 2.72 | 4.73 | 10.65 |

*hydroquinoline of the formula VIII: 5-chloro-7-(2-ethylhexyl)-8-hydroxyquinoline

EXAMPLE 8

The separation of yttrium and the rare earths was carried out continuously in the apparatus shown in the accompanying FIGURE of Drawing.

This apparatus included a battery of mixer-settlers 1 and a tank 2 for the preneutralization of the solvent.

The solvent was introduced into the preneutralization tank via line 5. A basic solution, for example of ammonia, was added to tank 2 via line 3.

The preneutralized solvent was introduced into the battery of mixer-settlers 1 and exited same via outlet 6, from which it was transferred to a facility, which is not shown, for the recovery of the rare earths, for example by back-extraction with a mineral acid solution (hydrochloric acid or nitric acid). The solvent was then recycled via line 5.

The rare earth and yttrium solution to be treated was introduced via inlet 4 into an intermediate stage of the battery and exited again via outlet 7 after extraction of the rare earths.

A solution containing rare earths but devoid of yttrium, was introduced via inlet 8 to the upstream end of the battery in order to deplete the solvent with respect to yttrium.

The material balance in the apparatus was as follows:

(a) aqueous solution introduced via inlet 4:
(i) rare earth + yttrium concentration: 1.33 mol/l,
(ii) pH : 4,
(iii) distribution of rare earths:

| $Y_2O_3$ | 40% |
|---|---|
| $Ln_2O_3$ | 60% |

(iv) flow rate: 80 l/h;
(b) rare earth solution introduced via inlet 8:
(i) lanthanide concentration: 1.66 mole/l,
(ii) pH : 4.0,
(iii) flow rate: 100 l/h;
(c) solvent introduced via inlet 5:

| (i) | "ALiquat 336" | 30% |
|---|---|---|
|  | "Kelex 100" | 15% |
|  | Solvesso | 55% |

(ii) flow rate: 1 $m^3$/h;
(d) basic solution introduced via inlet 3:
(i) $NH_4OH$: 10 mole/l,
(ii) flow rate: 10 l/h;
(e) aqueous solution charged with yttrium and exiting the battery via outlet 7:

(i) yttrium concentration: 0.24 mole/l,
(ii) NH$_4$NO$_3$ concentration: 0.55 mole/l,
(iii) Y$_2$O$_3$/RE$_2$O$_3$ > 99.99%,
(iv) flow rate: 180 l/h;

(f) solvent charged with rare earths and exiting via outlet 6:

(i) overall rare earth concentration: 0.2 mole/l,
(ii) Y$_2$O$_3$/RE$_2$O$_3$ ratio < 700 ppm,
(iii) flow rate: 1 m$^3$/h.

While the invention has been described in the terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

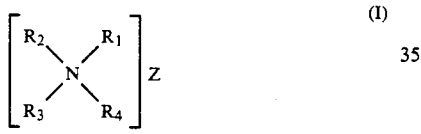

in which M is nitrogen, phosphorus or arsenic, Z is an anion, and R$_1$, R$_2$, R$_3$ and R$_4$, which may be identical or different, are each an aliphatic hydrocarbon radical having from 1 to 18 carbon atoms or an aromatic radical, and (b) a substituted hydroxyquinoline having the general formula (II):

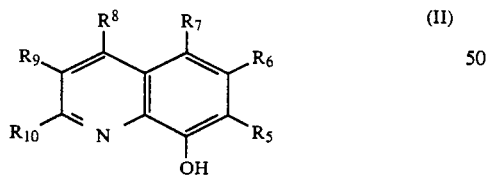

in which R$_5$, R$_6$, R$_7$, R$_8$, R$_9$ and R$_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, substantially all of the rare earth values in the aqueous solution except yttrium being extracted into the organic phase during the contacting step.

2. The process as defined by claim 1, wherein said substituted hydroxyquinoline (b) has the general formula (III):

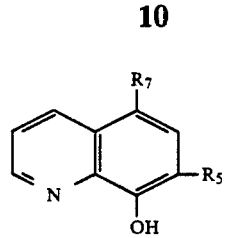

in which R$_5$ is a substituted or unsubstituted alkenyl radical having from 8 to 20 carbon atoms, and R$_7$ is a hydrogen or halogen atom or a substituted or unsubstituted alkyl, alkenyl, cycloaliphatic or aromatic hydrogen radical.

3. The process as defined by claim 2, wherein formula (III), R$_5$ is a radical having the following general formula:

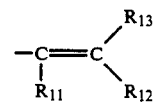

in which R$_{11}$, R$_{12}$ and R$_{13}$, which may be identical or different, are each hydrogen or a substituted or unsubstituted alkyl, aromatic or alkylaryl hydrocarbon radical.

4. The process as defined by claim 2, wherein formula (III), R$_5$ is a radical having the following general formula

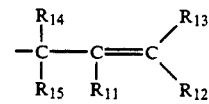

in which R$_{11}$, R$_{12}$, R$_{13}$, R$_{14}$ and R$_{15}$, which may be identical or different, are each hydrogen or a substituted or unsubstituted hydrocarbon radical.

5. The process as defined by claim 1, wherein formula (II), R$_5$ is a C$_n$H$_{2n+1}$ radical in which n is an integer ranging from 8 to 20.

6. The process as defined by claim 1, wherein said substituted hydroxyquinoline (b) has the general formula (VIII):

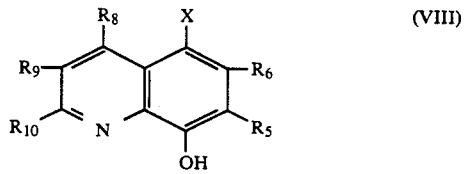

in which R$_5$ is an alkyl or alkenyl radical having from 8 to 20 carbon atoms and X is a halogen atom.

7. The process as defined by claim 1, said aqueous solution containing at least 1 mol/l of nitrate ions.

8. The process as defined by claim 7, said aqueous solution containing from 1 to 10 mol/l of nitrate ions.

9. The process as defined by claim 1, said aqueous solution having a pH ranging from 1 to 7.

10. The process as defined by claim 1, wherein the concentration of said anionic extractant in the organic phase ranges from 0.1 mol/l to 0.7 mol/l.

11. The process as defined by claim 1, wherein the concentration of said substituted hydroxyquinoline in the organic phase range from 0.05 mol/l to 1.25 mol/l.

12. The process as defined by claim 1, further comprising recovering said yttrium from the aqueous phase.

13. The process as defined by claim 1, further comprising recovering said other rare earth values from said organic phase.

14. The process as defined by claim 1, further comprising back-extracting said other rare earth values from said organic phase by washing same with an acidic solution.

15. The process as defined by claim 1, further comprising liquid/liquid extracting said yttrium values from the aqueous phase.

16. The process as defined by claim 1, further comprising precipitating said yttrium values from the aqueous phase.

17. The process as defined by claim 1, said organic phase comprising an inert organic diluent.

18. The process as defined by claim 1, wherein the concentration of nitrate ions in said aqueous solution is greater than 1 mol/l.

19. The process as defined by claim 18, said concentration of nitrate ions ranging from 1 mol/l to 10 mol/l.

20. The process as defined by claim 1, said aqueous solution comprising nitric acid, an ammonium nitrate, or an alkali or alkaline earth metal nitrate.

21. The process as defined by claim 1, said aqueous solution comprising a solution of digestion of a yttrium/rare earth ore material.

22. The process as defined by claim 1, said aqueous solution comprising yttrium and/or rare earth nitrates.

23. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

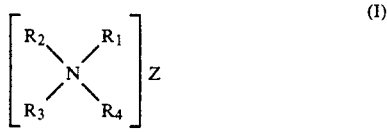

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

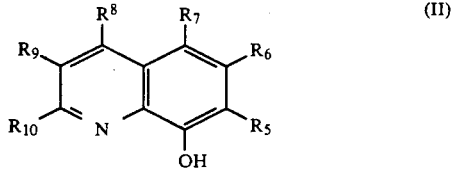

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, the process further comprising obtaining a recovered aqueous solution by separating the aqueous solution from the organic phase after the contacting step, the recovered aqueous solution including rare earth values consisting essentially of yttrium.

24. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

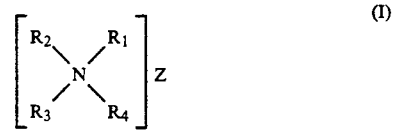

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

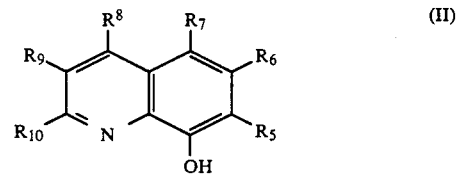

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, the process further comprising obtaining a recovered aqueous solution by separating the aqueous solution from the organic phase after the contacting step, the recovered aqueous solution including rare earth values, wherein $Y_2O_3/RE_2O_3$ is at least 99%, $Y_2O_3$ representing a total weight of yttrium oxide in the recovered aqueous solution and $RE_2O_3$ representing a total weight of all rare earths including yttrium in the recovered aqueous solution.

25. A process for the selective separation of yttrium values from other rare earth values contained in mixed aqueous ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

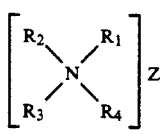

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

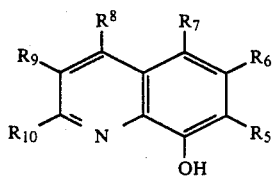

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, $F_{Nd/Y}$ being at least about 10.

26. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

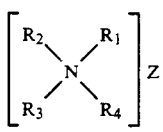

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

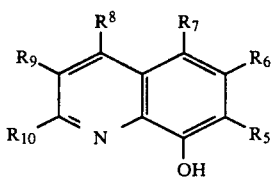

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, $F_{Sm/Y}$ being at least about 8.

27. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

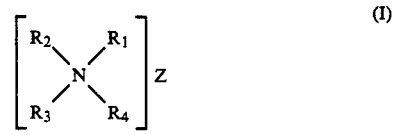

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

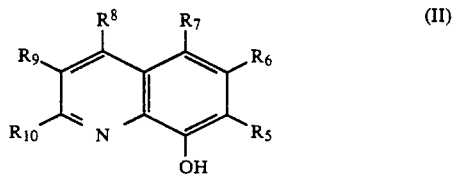

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, $F_{Eu/Y}$ being at least about 7.

28. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

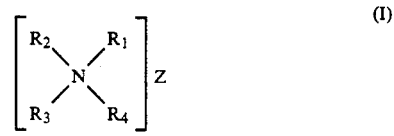

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

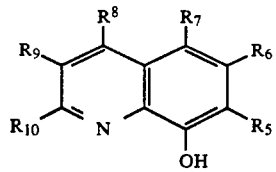

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, $F_{Gd/Y}$ being at least about 3.

29. A process for the selective separation of yttrium values from other rare earth values contained in mixed aqueous nitrate ion-containing solutions thereof, comprising contacting such aqueous solution with a water-immiscible organic phase which comprises a selective extractant for said other rare earth values, whereby said other rare earth values are selectively liquid/liquid extracted into said organic phase, said selective extractant comprising:

(a) an anionic compound having the general formula (I):

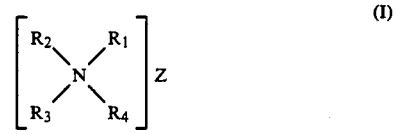

in which M is nitrogen, phosphorus or arsenic, Z is an anion, and $R_1$, $R_2$, $R_3$ and $R_4$, which may be identical or different, are each an aliphatic hydrocarbon radical having from 1 to 18 carbon atoms or an aromatic radical, and (b) a substituted hydroxyquinoline having the general formula (II):

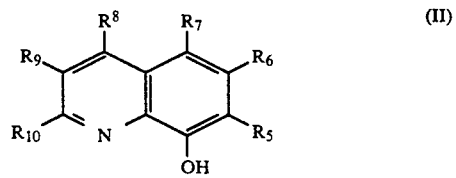

in which $R_5$, $R_6$, $R_7$, $R_8$, $R_9$ and $R_{10}$, which may be identical or different, are each a hydrogen or halogen atom, or a substituted or unsubstituted alkyl, alkenyl, cycloaliphatic or aromatic hydrocarbon radical, with the proviso that at least one such radical is a hydrocarbon radical having from 8 to 20 carbon atoms, $F_{RE/Y}$ being at least about 1.

* * * * *